Nov. 5, 1963  C. R. DION  3,109,393
LAWN AERATING AND FERTILIZING MACHINE
Filed March 9, 1959  2 Sheets-Sheet 1

INVENTOR.
Clifton R. Dion
BY Edward C. Healy
Attorney

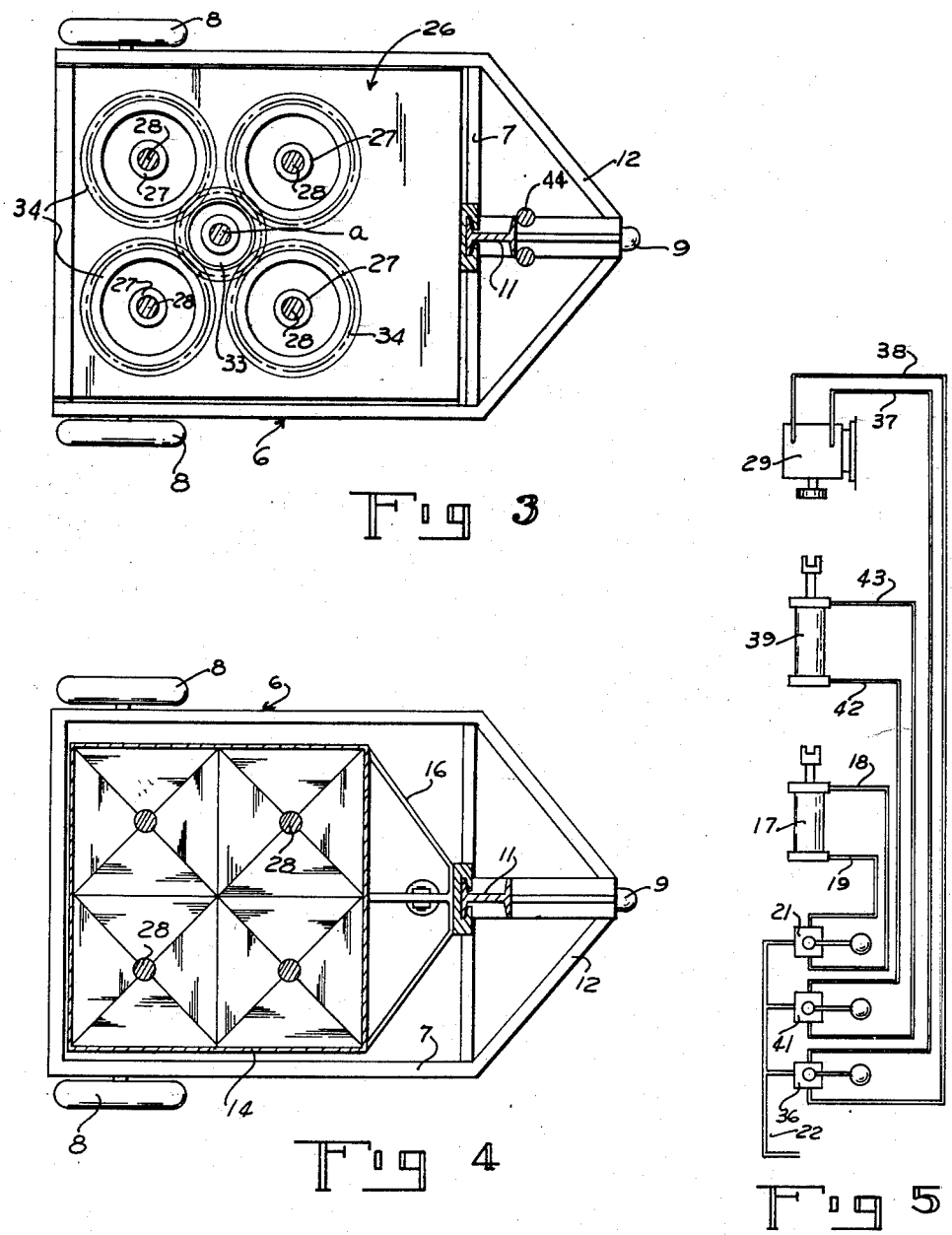

3,109,393
LAWN AERATING AND FERTILIZING MACHINE
Clifton R. Dion, San Mateo, Calif.
(10 Garden Court, Belmont, Calif.)
Filed Mar. 9, 1959, Ser. No. 798,259
1 Claim. (Cl. 111—89)

This invention relates to a turf boring machine and has particular reference to a movable machine for aerating and fertilizing a lawn or the like for improving the condition of the same.

Broadly stated the principal object of the invention is the provision on the machine of a gang of carbide drills that are mechanically lowered into the lawn to bore holes therein, the drills extending downward through a fertilizer holding bin and operating through funnels at the bottom of the bin. While the drills are removing earth, means are provided for lifting the funnels clear of the ground, thus allowing the dirt to be thrown out and when the drills reverse the fertilizer is forced into the holes. Thereafter the funnels are lowered to make contact with the ground and form a closed path for the passage of the fertilizer from the bin into the holes in the ground to thus obtain the most advantageous results in enriching the lawn.

A further object of the invention is the employment of an air motor that obtains air from a remote source of compressed air supply to actuate a train of valve controlled gears to cause the drills to reciprocate in the apertured fertilizer holding bin to first dig the holes in the lawn and thereafter fill the holes with the fertilizer.

An additional object of the invention is the provision of a wheeled machine that is simple in construction, economical to manufacture, positive in operation, strong, durable and highly efficient and serviceable in use.

Other objects and advantages of the invention will be apparent during the course of the following description.

Referring to the drawings;

FIG. 3 is a horizontal sectional view through the drill head of the invention, the view being taken on the line 3—3 of FIG. 1, FIG. 4 is a horizontal section view through the bin, the view being taken on the line 4—4 of FIG. 1, and FIG. 5 is a schematic diagram of the air system employed in the invention.

Figure 1:
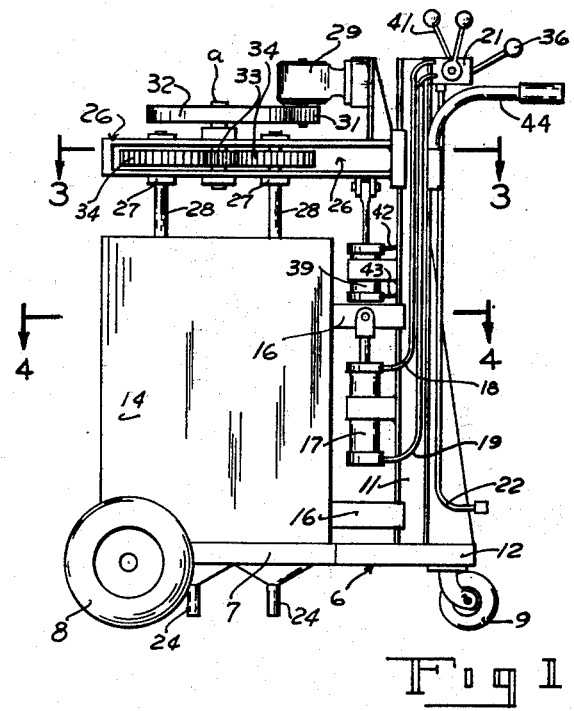
FIG. 1 is a side elevational view of the machine constructed in accordance with my invention.

Referring to the illustrative embodiment of the machine of the present invention as shown in the drawings, the numeral 6 designates in general a carriage comprising a base frame 7 supported upon a pair of main supporting wheels 8 and a caster wheel 9 cooperating with the wheels 8 to provide a three point support for the carriage. The caster mounting of the wheel 9 permits the carriage to be easily rolled and guided over a lawn or other area to be fertilized.

A vertically disposed guide column 11 is mounted upon the base frame 7, preferably upon a yoke shaped extension 12 upon which the caster wheel 9 is mounted. A hopper 14 is mounted upon the carriage by means of a pair of brackets 16 slidably connected to the column. A ram 17 is mounted upon the column and connected to one of the brackets 16, as best shown in FIG. 1 of the drawings. The ram 17 is arranged to be actuated by fluid pressure, which may be either pneumatic or hydraulic, to raise and lower the hopper 14 bodily relative to the frame. Fluid pressure is directed to the ram cylinder by means of supply and return connections 18 and 19 through a manually controlled valve 21 from a main supply line 22. The valve 21 may be of conventional structure and is operated in conventional manner to control and direct the delivery of fluid pressure from any available source of supply, not shown, through the main supply line 22.

Figure 2:
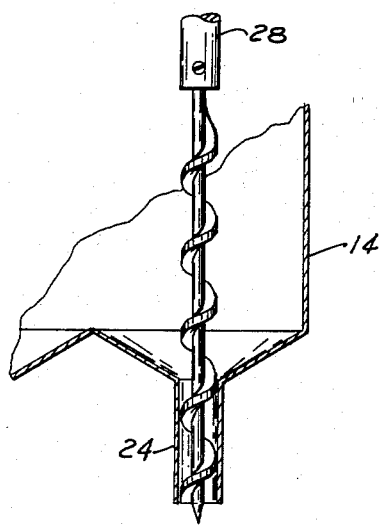
FIG. 2 is an enlarged fragmentary view of one of the drills in an operative position relative to the fertilizer holding bin and an outlet funnel thereof.

The hopper 14 has its bottom shaped to form a plurality of funnel shaped outlets terminating in downwardly extending spouts 24, as best shown in FIGS. 1 and 2 of the drawings. The hopper is designed to contain a substantial supply of a pulverized fertilizing material of any selected character.

A drill head, designated in general by the numeral 26 is slidably mounted upon the upper portion of the column 11, and is arranged to overhang the hopper 14. The drill head is provided with a plurality of chucks 27 of any conventional type. The chucks 27 are aligned with the spouts 24, and each is fitted with a boring bit 28 arranged to extend downwardly through a spout 24.

A fluid actuated motor 29 is mounted upon the drill head 26 adjacent the upper end of the column 11. The motor is arranged to drive the chucks 27 and the bits 28 engaged thereby through a suitable train of gears. As illustrated, a pinion 31 connected to the motor 29 meshes with a main drive gear 32. A second pinion 33 connected to the gear 32 by shaft "a," meshes with gears 34 connected to the chucks. The gear arrangement may be modified in numerous ways, and other conventional types of drive connections may be substituted, if desired. The motor is actuated by penumatic or hydraulic pressure directed thereto from the main supply line 22 through a suitable control valve 36 and supply and return connections 37 and 38, all of which may be of any conventional construction.

The drill head 26 is arranged to be raised and lowered along the guide column 11 by means of a fluid ram 39 secured to the column below the drill head. Fluid pressure from the main supply line 22 is controlled and directed to the ram 39 through a valve 41 and connections 42 and 43. The general arrangement of the fluid supply connections and control valves for the motor 29 and the rams 39 and 17 is indicated in somewhat diagrammatic form in FIG. 1, and in fully diagrammatic form in FIG. 5 of the drawings. Since such valves, rams, motor and connections are well known and their specific structures form no part of the present invention, a detailed disclosure of their structures and operation is herein unnecessary, and is therefore omitted.

In operation, the hopper is filled with a supply of fertilizer, and the main fluid supply line 22 is connected to a suitable supply of pneumatic or hydraulic pressure, which may be a portable compressor unit, or a stationary pressure tank reached by a long flexible hose, or other supply not shown. The carriage is moved to a desired position upon a lawn, or other areas to be fertilized, with both the drill head 26 and the hopper 14 in their elevated positions. The motor 29 is then activated to rotate the boring bits 28, and the ram 39 is activated to lower the drill head and cause the bits to bore holes in the ground below the hopper.

As the bits are advanced into the ground, dirt is displaced and piles around the bit. When the head 26 reaches its lowermost position, the operation of the ram 39 is reversed to raise the bits from the holes they have bored. At the same time, the ram 17 is activated to lower the hopper 14 and cause the lower ends of the spouts 24 to engage the ground at the top of the holes and form a closed passage from the hopper into the holes. As the bits 28 are withdrawn from the holes they have bored, their direction of rotation is reversed, thereby causing fertilizer to be positively fed from the hopper into the bored holes. After the bits have been fully elevated, the hopper is raised to its elevated position and the carriage may then be moved to another position and the operation repeated. A pair of handles 44 extend rearwardly from the column 11 so that the operator may readily move the carriage from place to place, with the control valves 21, 36 and 41 within easy reach as shown in FIG. 1, of the drawings.

Having thus described my invention, I claim:

A lawn aerating and fertilizer device comprising:
(A) a mobile support,
(B) a vertically disposed member mounted on said support,
(C) a material containing hopper having at least one vertically depending cylindrical spout means,
(D) means mounting said hopper on said member for vertical up and down movement of it and said spout,
(E) a drillhead having at least one helicoidal-shaped, rotatably mounted bit depending therefrom,
  (1) said bit being axially aligned with said spout means and of sufficient length to extend therethrough and project from the discharge end thereof and wherein the major diameter of said bit is substantially equal to the internal diameter of said spout means,
(F) means mounting said drillhead on said member for vertical up and down movement,
(G) means for rotating said bit in such a direction that, when the bit projects from the spout into the ground and the spout is elevated above the latter, the bit will displace earth upwardly to form a cavity in the ground and for rotating the bit in the reverse direction, when the spout is lowered and brought into close proximity to the bored cavity, to forcefully discharge material from said hopper and through said spout, into said bored cavity.

References Cited in the file of this patent

UNITED STATES PATENTS

| | | |
|---|---|---|
| 1,306,547 | Lyon | June 10, 1919 |
| 1,724,449 | Buddenbrock | Aug. 13, 1929 |
| 2,394,771 | Hill | Feb. 12, 1946 |
| 2,699,272 | Barth | Jan. 11, 1955 |
| 2,747,528 | Hunkins | May 29, 1956 |
| 2,918,130 | Thom | Dec. 22, 1959 |

FOREIGN PATENTS

| | | |
|---|---|---|
| 330,688 | Germany | Feb. 17, 1920 |
| 101,106 | Australia | May 19, 1937 |